United States Patent [19]
Hoggatt

[11] 4,318,720
[45] Mar. 9, 1982

[54] EXHAUST FILTER MUFFLER

[76] Inventor: Donald L. Hoggatt, 201 Witmer St., Apt. 109, Los Angeles, Calif. 90026

[21] Appl. No.: 59,076

[22] Filed: Jul. 19, 1979

[51] Int. Cl.³ .............................................. B01D 46/00
[52] U.S. Cl. ........................................ 55/276; 55/316; 55/498; 55/517; 55/DIG. 30; 60/311; 181/228; 181/267
[58] Field of Search ................. 55/DIG. 30, 276, 387, 55/316, 486, 498, 527, 517; 60/311, 297; 422/177; 181/228, 231, 252, 267

[56] References Cited
U.S. PATENT DOCUMENTS

| | | | |
|---|---|---|---|
| 2,834,425 | 5/1958 | Rawson | 181/252 |
| 2,984,315 | 5/1961 | Kleinecke | 55/DIG. 30 |
| 3,016,108 | 1/1962 | Myddelton | 55/DIG. 30 |
| 3,147,097 | 9/1964 | Aguas | 55/DIG. 30 |
| 3,154,388 | 10/1964 | Purse | 55/DIG. 30 |
| 3,479,145 | 11/1969 | Lentz | 181/288 |
| 3,633,343 | 1/1972 | Mark | 55/DIG. 30 |
| 3,712,029 | 1/1973 | Charlton | 55/DIG. 30 |
| 4,124,357 | 11/1978 | Akimoto et al. | 55/DIG. 30 |
| 4,149,862 | 4/1979 | Sewell, Sr. | 55/DIG. 30 |

FOREIGN PATENT DOCUMENTS

| | | | |
|---|---|---|---|
| 985055 | 3/1976 | Canada | 422/177 |
| 2313557 | 12/1976 | France | 55/DIG. 30 |
| 919667 | 2/1963 | United Kingdom | 422/177 |

*Primary Examiner*—Bernard Nozick

[57] ABSTRACT

A combined muffler and engine exhaust filter comprises a fixed outer shell and an inner shell. The inner shell is formed from two concentric perforated tubes held in fixed relationship to each other. Granulated or powdered filtering material fills the space between the concentric tubes. The engine exhaust is connected to one end of the combined muffler and filter. An exhaust pipe is connected to the other end. The structure which holds the inner shell and outer shell in fixed relationship to each other also causes the engine exhaust to pass through the perforations in one tube and move in a radial direction through the filter material and through the perforations in the other tube. The length of the concentric tubes, the size and number of perforations, and the thickness of the filtering material between the concentric tubes selected to adequately filter the engine exhaust without incurring an objectionable increase in back pressure. The spacing between the inner and outer shell is selected to provide the volume necessary for the required muffling action.

3 Claims, 3 Drawing Figures

EXHAUST FILTER MUFFLER

BACKGROUND AND BRIEF SUMMARY

Concern with air pollution caused by engine exhaust emissions has risen dramatically in recent years. Accordingly, intensive efforts have been made to design engines which burn clean. However, engines which have been designed to burn clean tend to become dirty with increased use. In addition, there are millions of automotive vehicles on the road which were designed before concern with air pollution developed. Accordingly, there is a need for a device which is compatible with all automotive vehicles and which minimizes air pollution from engine exhaust.

Heretofore, efforts have been made to give the motor vehicle muffler the additional function of cleaning or filtering the engine exhaust. Such prior devices have the effect of increasing engine back pressure, as exemplified by the patent to Bembinster, U.S. Pat. No. 3,115,209. However, an increase in engine back pressure decreases engine efficiency and this, in days of high fuel cost, is objectionable. To overcome this problem, as exemplified by the patent to Kile, U.S. Pat. No. 3,593,499, a motor-driven fan was put inside the muffler. Such devices, however, necessarily reduce engine efficiency by the amount of energy necessary to drive the fan, and, in addition, such devices are expensive and liable to failure caused by heat and vibration.

These problems have now been overcome, as shown herein, by providing a combined muffler and filter which has no moving parts and which is formed from a fixed outer shell and an inner shell. The inner shell comprises concentric perforated tubes, the space between these tubes is filled with a filtering material and this material is kept in position by layers of fiberglass wrapped around the outer surface of each tube. The fiberglass has the added function of serving as an auxiliary filter to trap particles of engine exhaust which are not stopped by the filtering material. The length of the concentric tubes, their size, as well as the comparatively small radial distance the exhaust gasses must travel through the concentric tubes, is selected to adequately filter the engine exhaust without producing an objectionable increase in back pressure. The spacing between the inner and outer shell provides the volume necessary to muffle the engine noise.

An important object of this invention, therefore, is to provide a combined motor vehicle muffler and engine exhaust filter which filters the engine exhaust without substantially increasing engine back pressure.

A further object of this invention is to provide a combined muffler and engine exhaust filter which has no moving parts and which provides a filtering action without an objectionable increase in engine back pressure.

These and other objects of this invention will become more apparent when better understood in the light of the accompanying specification and drawings, wherein.

Figure 1:
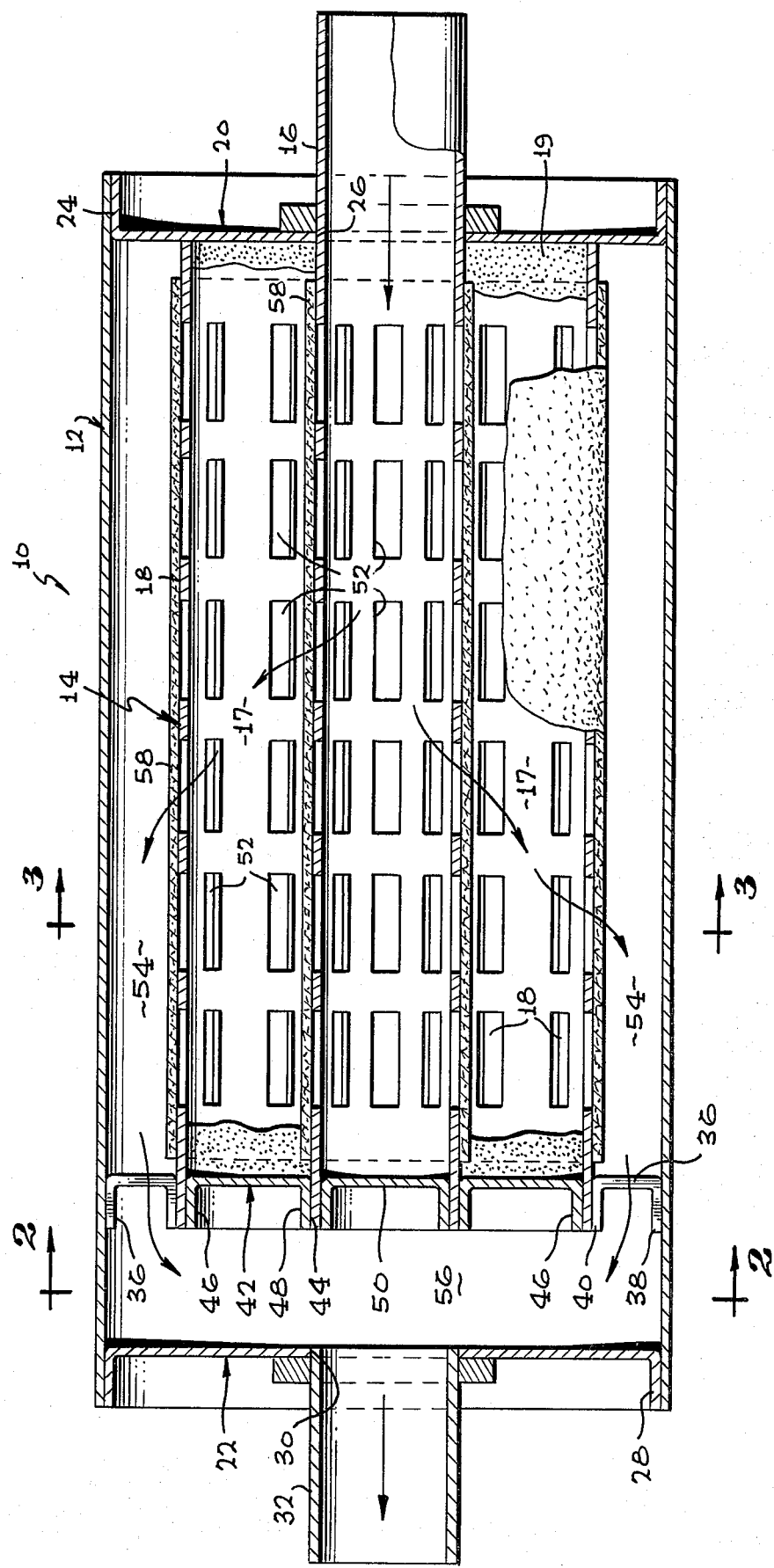
FIG. 1 is a longitudinal cross-sectional view of the device.

Referring now to FIG. 1 of the drawings, a combined muffler and filter indicated generally by the reference numeral 10 comprises an outer shell 12 and an inner shell indicated generally by the reference numeral 14.

The inner shell comprises perforated tubes 16 and 18 which are concentric with each other and are in radially spaced relationship to each other and to the outer shell 12 defining a space 17 therebetween. The outer shell is closed off by end plates 20 and 22 which are mounted at each end of the shell. End plate 20 is generally circular with transverse flanges 24 at its periphery. The end plate 20 is provided with a centrally disposed opening 26 which is sized to receive and support the outer surface of the perforated tube 16. Welding around the periphery of opening 26 prevents leakage of gases from inside the combined filter and muffler through the opening 26. End plate 22 is like end plate 20 and is generally circular with the transverse flange 28 at its periphery. End plate 22 has centrally disposed opening 30 sized to receive and support exhaust pipe 32. As seen in FIG. 1, the outer surface of the exhaust pipe is welded to the end plate 22. End plate 22 is rearward of the rear end of the inner shell 14, defining a space 56 for reasons to be described below. Flanges 24 and 28 provide a stable support for the end plates against the inner surface of the outer shell 12.

Figure 2:
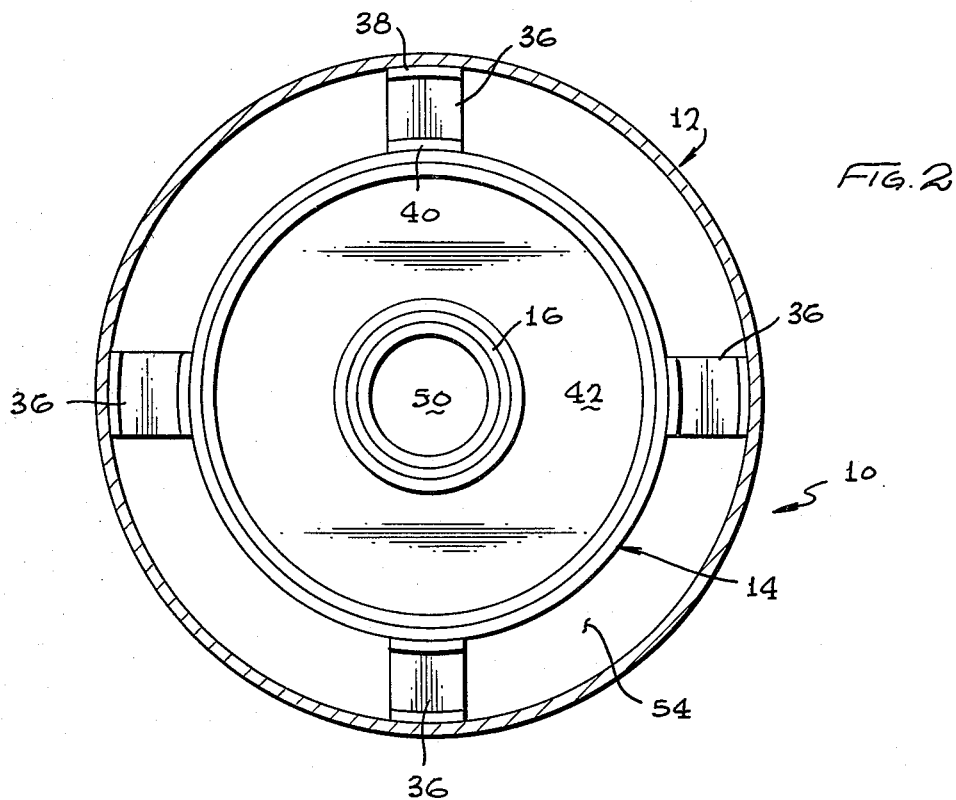
FIG. 2 is a vertical cross-sectional view partially in elevation taken on a line 2—2 of FIG. 1.
Figure 3:
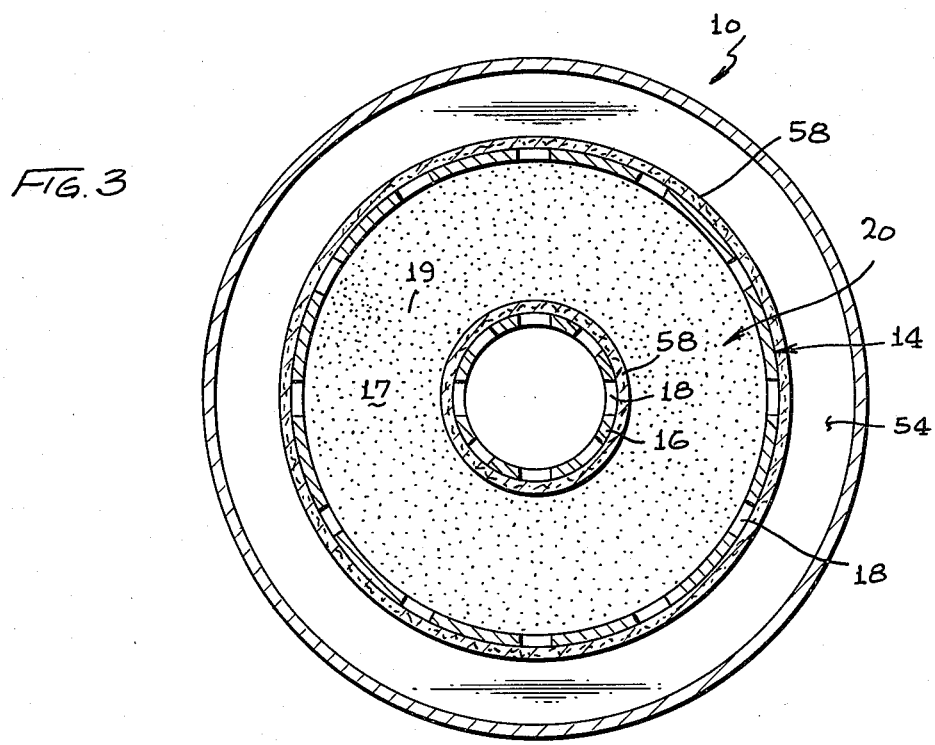
FIG. 3 is a cross-sectional view taken substantially along line 3—3 of FIG. 1.

The inner end of perforated tube 18 is secured to end plate 20 by any suitable means, such as welding. The outer end of the perforated tube 18 is secured to the inner surface of the outer shell 12 by means of spacers 36. This holds the perforated tube 18 concentric with and in radially inwardly spaced relationship to the outer shell 12. As seen in FIG. 2, four spacers 36 are disposed around the axis of the combined filter and muffler at an angular separation of 90°. These spacers are channel shaped in cross-section with mounting flanges 38 and 40. As shown in FIG. 2, flanges 38 of the spacers are secured to the inner surface of shell 12 while flange 40 is secured to the outer surface of tube 18.

Perforated tube 16 is concentric with perforated tube 18 and is supported inside perforated tube 18 in radially inwardly spaced relationship by means of a closure member 42. Closure member 42 is circular in cross-section and has a centrally disposed opening 44 sized to receive and support the outer end of the perforated tube 16. As seen in FIG. 1, the closure member 42 is provided with transverse mounting flanges 46 and 48.

Mounting flange 46 is sized to lie against and support the inner surface of perforated tube 18 while mounting flange 48 is designed to lie against and support the outer surface of the perforated tube 16.

As seen in FIG. 1, the above-described arrangement closes off the space 17 between the concentric tubes because the inner end of tube 18 lies against the end plate 20 and the outer end is closed off by the closure member 42. In addition, the outer end of the perforated tube 16 is closed off by a plug 50.

The inner end of the perforated tube 16 is adapted to be connected to the engine exhaust manifold or the like.

It is apparent that the spacers 36, end plate 20, closure member 42 and plug 50 all cooperate to help define a generally radial path for exhaust gases through the perforated tubes and through any filter material between the tubes.

When the inner perforated tube 16 is connected to the engine exhaust, the engine exhaust flowing through tube 16 can only go through the perforations 52 in tube 16 through the space 17 and out the perforations 52 in tube 18 to the space 54 between the outer surface of tube 18 and the inner surface of the outer shell 12. From there, the exhaust gases can only flow to the space 56 between the outer end of the inner shell 14 and the end plate 22. Space 56 communicates with the exhaust pipe 30 which provides an outlet for the exhaust gases to the ambient air. The volume of spaces 54 and 56 are large enough to provide the volume necessary to muffle the sound of the engine exhaust.

To filter the exhaust gases, space 17 between the perforated tubes is filled with a filtering material 58 which in this embodiment comprises a mixture of sodium bicarbonate and carbon mixed in equal proportions. The carbon may be formed from wood charcoal ground fine.

In order to prevent the filtering material from falling out of the space 17 through the perforations 52 the outer surface of tubes 16 and 18 is covered with a fiberglass cloth 58 which is secured to the outer surface of the perforated tubes by any suitable means. This fiberglass cloth has two functions. One function is to retain the solid filtering material in space 17 and prevent it from falling through the perforations 54 and out of the space 17 between the tubes. The other purpose is to serve as a back-up filter to prevent particles of engine exhaust which make their way through the filtering material from escaping into the ambient air.

Having shown and described the invention, what I claim as new is:

1. A combined muffler and engine exhaust filter comprising a fixed outer shell and a concentric inwardly spaced inner shell, said inner shell comprising inner and outer concentric perforated tubes disposed in radially spaced relationship to each other, said concentric tubes having longitudinally spaced inner and outer ends, a first closure member, said closure member circular in cross section with a circular centrally disposed opening and inner and outer longitudinally extending mounting flanges, the end portion of said inner concentric tube extending through said circular centrally disposed opening and abutting the facing surfaces of the inner longitudinally extending mounting flanges, the opposed surfaces of said outer mounting flanges abutting the inner surface of the end portion of said outer perforated tube whereby the space between the inner and outer concentric tubes is closed off at the outer end, a closure plug having longitudinally extending mounting flanges, said closure plug sized to close off the outer end portion of the inner perforated tube with its mounting flanges abutting the inner surface of the inner perforated tube in radially spaced relationship to the inner and outer mounting flanges on said closure member, whereby the inner and outer perforated tubes are held in concentric radially spaced relationship to each other, means for closing off the space between the inner and outer concentric tubes at the inner end, a filtering cloth wrapped around the surface of each perforated tube, a filter material filling the space between said perforated concentric tubes, an exhaust pipe extending into said fixed outer shell providing direct communication between the ambient air and the perforated cylindrical surfaces of said inner concentric tube, an engine exhaust pipe in fixed relation between an engine and the inner cylindrical perforated surface of the inner perforated tube to provide an engine exhaust path from the engine radially through the filter material between said inner and outer perforated tubes and out through said exhaust pipe, the length of the inner shell and the size and number of perforations and the spacing between the concentric perforated tubes large enough to filter the engine exhaust without causing an objectionable increase in engine back pressure, the space between the inner and outer shells and the exhaust tube large enough to provide the volume necessary to muffle the sound of the engine exhaust.

2. A combined muffler and engine exhaust filter comprising a fixed outer shell and a concentric inwardly spaced inner shell, said inner shell comprising inner and outer concentric perforated tubes disposed in radially spaced relationship to each other, said concentric tubes having longitudinally spaced inner and outer ends, a first closure member, said closure member circular in cross section with a circular centrally disposed opening and inner and outer longitudinally extending mounting flanges, the end portion of said inner concentric tube extending through said circular centrally disposed opening and abutting the facing surfaces of the inner longitudinally extending mounting flanges, the opposed surfaces of said outer mounting flanges abutting the inner surface of the end portion of said outer perforated tube whereby the space between the inner and outer concentric tubes is closed off at the outer end, a closure plug having longitudinally extending mounting flanges, said closure plug sized to close off the outer end portion of the inner perforated tube with its mounting flanges abutting the inner surface of the inner perforated tube in radially spaced relationship to the inner and outer mounting flanges on said closure member, whereby the inner and outer perforated tubes are held in concentric radially spaced relationship to each other, means for closing off the space between the inner and outer concentric tubes at the inner end, a filter material filling the space between said perforated concentric tubes, an exhaust pipe extending into said fixed outer shell providing direct communication between the ambient air and the perforated cylindrical surfaces of said inner concentric tube, an engine exhaust pipe in fixed relation between an engine and the inner cylindrical perforated surface of the inner perforated tube to provide an engine exhaust path from the engine radially through the filer material between said inner and outer perforated tubes and out through said exhaust pipe, the length of the inner shell and the size and number of perforations and the spacing between the concentric perforated tubes large enough to filter the engine exhaust without causing an objectionable increase in engine back pressure, the space between the inner and outer shells and the exhaust tube large enough to provide the volume necessary to muffle the sound of the engine exhaust, and a fiberglass cloth wrapped around the outer surface of each perforated tube, the filter material between said inner and outer concentric tubes comprising a mixture of sodium bicarbonate and finely ground carbon, said fiberglass cloth serving to retain said filter material in the space between said perforated tubes and serving as an auxiliary filter for engine exhaust gases passing through the perforated tubes.

3. The combined muffler and engine exhaust filter described in claim 2 wherein the filter material is a mixture of sodium bicarbonate and finely ground carbon in equal proportions.

* * * * *